(12) United States Patent
Gotou et al.

(10) Patent No.: US 9,056,800 B2
(45) Date of Patent: Jun. 16, 2015

(54) ADDITIVE FOR MOLDING OF CERAMIC MATERIAL

(75) Inventors: Akihiro Gotou, Nagoya (JP); Hideo Matsuzaki, Nagoya (JP)

(73) Assignee: TOAGOSEI., LTD., Tokyo (JP)

( * ) Notice: Subject to any disclaimer, the term of this patent is extended or adjusted under 35 U.S.C. 154(b) by 0 days.

(21) Appl. No.: 13/822,179

(22) PCT Filed: Sep. 6, 2011

(86) PCT No.: PCT/JP2011/070227
§ 371 (c)(1),
(2), (4) Date: Apr. 26, 2013

(87) PCT Pub. No.: WO2012/033078
PCT Pub. Date: Mar. 15, 2012

(65) Prior Publication Data
US 2013/0207055 A1    Aug. 15, 2013

(30) Foreign Application Priority Data
Sep. 10, 2010    (JP) .................... 2010-202761

(51) Int. Cl.
| H01B 1/00 | (2006.01) |
| H01B 1/12 | (2006.01) |
| C04B 35/632 | (2006.01) |
| C08F 20/06 | (2006.01) |
(Continued)

(52) U.S. Cl.
CPC ............ *C04B 35/632* (2013.01); *H01B 1/12* (2013.01); *C08F 20/06* (2013.01); *C08F 20/58* (2013.01); *C04B 24/12* (2013.01); *C04B 24/124* (2013.01)

(58) Field of Classification Search
CPC ...... A61L 15/60; C08L 33/02; B01J 2523/00; B01J 2523/68; C08F 220/06; H01B 1/12
USPC .............................. 264/670; 502/402; 252/500
See application file for complete search history.

(56) References Cited

U.S. PATENT DOCUMENTS

2006/0192326 A1 *  8/2006  Matsunaga et al. ........... 264/670
2009/0267273 A1    10/2009  Kaneda et al.
(Continued)

FOREIGN PATENT DOCUMENTS

| CN | 1835772 A | 9/2006 |
| JP | 2002 293645 | 10/2002 |
(Continued)

OTHER PUBLICATIONS

Combined Chinese Office Action and Search Report issued Oct. 28, 2013 in Patent Application No. 201180043227.9 (with English language translation).
International Search Report Issued Dec. 6, 2011 in PCT/ JP11/70227 Filed Sep. 6, 2011.

*Primary Examiner* — Mark Kopec
*Assistant Examiner* — William Young
(74) *Attorney, Agent, or Firm* — Oblon, McClelland, Maier & Neustadt, L.L.P.

(57) ABSTRACT

The present invention relates to an additive for use in the molding of a ceramic material, which exhibits satisfactory water absorption performance in a ceramic green ceramic clay, can highly achieve both high fluidability and low loading performance during extrusion molding and high shape-retaining performance after extrusion at the same time, and comprises polymer microparticles. This additive for use in the molding of a ceramic material comprises polymer microparticles, is characterized in that the polymer microparticles have an average particle size between 10 and 150 μm when the polymer microparticles are swollen with ion exchange water until the swollen polymer microparticles reach a saturated state and can absorb 10-60 mL/g of ion exchange water under ordinary pressure, and is also characterized in that an aqueous dispersion prepared by dispersing 1 part by mass of the polymer microparticles in 110 parts by mass of ion exchange water has an electrical conductivity of 1500 μS/cm or less at 25° C.

20 Claims, 1 Drawing Sheet

(51) Int. Cl.
*C08F 20/58* (2006.01)
*C04B 24/12* (2006.01)

(56) References Cited

U.S. PATENT DOCUMENTS

2010/0183499 A1* 7/2010 Uchida et al. ............... 423/502
2011/0021712 A1   1/2011 Gotou et al.

FOREIGN PATENT DOCUMENTS

| JP | 2004 262747 | 9/2004 |
| JP | 2007 319029 | 12/2007 |
| JP | 2009 46385 | 3/2009 |
| WO | WO 2005/025628 A1 | 3/2005 |
| WO | 2008 084844 | 7/2008 |
| WO | 2009 096268 | 8/2009 |

\* cited by examiner

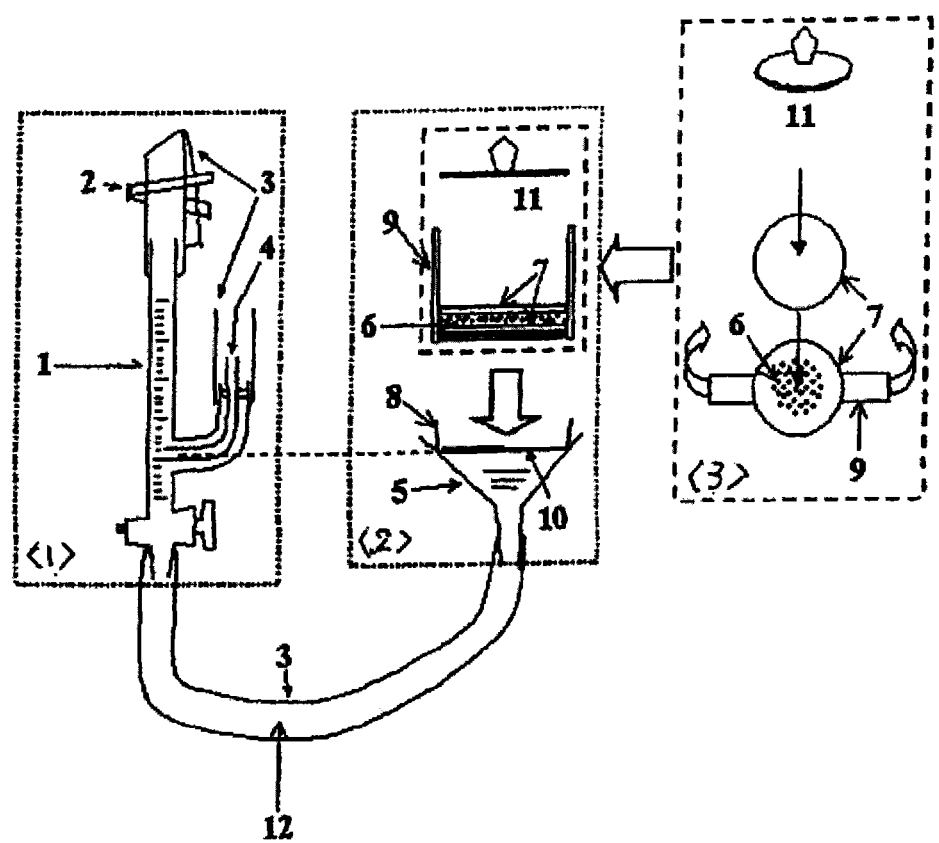

ADDITIVE FOR MOLDING OF CERAMIC MATERIAL

CROSS REFERENCE TO RELATED APPLICATIONS

The present application is a 35 U.S.C. §371 national stage patent application of International patent application PCT/JP2011/070227, filed on Sep. 6, 2011, published as WO/2012/033078 on Mar. 15, 2012, the text of which is incorporated by reference, and claims the benefit of the filing date of Japanese application no. 2010-202761, filed on Sep. 10, 2010, the text of which is also incorporated by reference.

FIELD OF THE INVENTION

The present invention relates to an additive for molding a ceramic material which consists of a polymer microparticle with a higher cross-linking density, and which is effective to improve kneadability and moldability of a ceramic material for forming a highly precise molded article with excellent reproducibility particularly when the material is subjected to water-based ceramic molding.

BACKGROUND ART

Examples of typical molding methods of ceramics include various methods such as extrusion molding, injection molding, and slip casting. With respect to the extrusion molding, for example, this is a method configured to conduct molding by applying a pressure to a kneaded composition (hereinafter referred to as "green ceramic clay") obtained by kneading a ceramic powder, a binder, water, and the like to thereby extrude a green ceramic clay through a die, and is thus suitable for producing rod-like or pipe-like products each having a constant cross-sectional shape, with a good efficiency. Although the extrusion molding is also used to produce filters, catalyst carriers, and the like, it has been strongly desired in recent years to achieve highly precise extrusion molding so as to improve performances of such products.

To obtain a highly precise extrusion molded article, it is required to improve moldability of a green ceramic clay upon extrusion molding. Patent Literature 1 discloses a method configured to add a dispersant comprising a specific fatty acid salt to thereby lower a viscosity of a green ceramic clay. This method is problematic in that the moldability is still insufficient, and in that smooth molded bodies are hardly obtained. Further, Patent Literature 2 discloses a dispersant containing a polyoxyalkylene unit excellent in lubricating ability of a molded article. It is required to use a large amount of dispersant in order to sufficiently lower a viscosity of a green ceramic clay, such that the dispersant obstructs an interaction between binder molecules, thereby occasionally and considerably deteriorating a shape-retaining ability, a molded article strength, and the like.

In turn, the present applicant has aimed at simultaneously providing a green ceramic clay with a higher flowability upon extrusion molding and ensuring a shape-retaining ability of a molded article after extrusion, and thus has proposed a production method of a porous ceramic, configured to adopt specific polymer microparticle having a water absorbing ability in Patent Literature 3. In order to simultaneously achieve a higher flowability upon extrusion molding and ensure a shape-retaining ability after extrusion by adopting such polymer microparticle, it is required to attain such a design that: part of water is released from the polymer microparticle by a pressure applied upon extrusion molding, and then the polymer microparticle quickly absorb the water therearound after the pressure is released to thereby enhance a hardness of a molded article.

Nonetheless, even in case of adopting the polymer microparticle according to the disclosure of Patent Literature 3, ionic impurities are released when residual monomers therefor are present in a large amount, such that the impurities obstruct the water absorbing ability of the polymer microparticle in a manner to occasionally lead to an insufficient water absorbing ability of the polymer microparticle in a green ceramic clay, thereby resultingly and occasionally failing to satisfactorily achieve simultaneous establishment of a higher flowability of the green ceramic clay upon extrusion molding and an assurance of a shape-retaining ability of a molded article after extrusion.

PRIOR ART LITERATURE

Patent Literature

Patent Literature 1: JP A 2002-293645
Patent Literature 2: JP A 2009-46385
Patent Literature 3: JP A 2004-262747

DISCLOSURE OF THE INVENTION

Problem that the Invention is to Solve

It is therefore an object of the present invention to provide an additive for molding a ceramic material which consists of a polymer microparticle and exhibits a sufficient water absorbing ability in a green ceramic clay, thereby enabling to simultaneously and highly establish a higher flowability and a lower loading property of the green ceramic clay upon extrusion molding, and a higher shape-retaining ability after extrusion.

Means for Solving the Problem

The present inventors have earnestly investigated an additive and resultingly found that it is effective to adopt polymer microparticle which contains an ionic functional group as an additive upon ceramic molding when the polymer microparticle exhibit: (a) an average particle size between 10 and 150 μm when the polymer microparticle is swollen with ion exchange water until the swollen polymer microparticle reaches a saturated state; (b) an ion exchange water absorbing amount between 10 and 60 mL/g at an ordinary pressure; and (c) an electroconductivity of 1,500 μS/cm or less at a temperature of 25° C., in a form of aqueous dispersion obtained by dispersing 1 part by mass of the polymer microparticle in 110 parts by mass of ion exchange water; thereby completing the present invention.

The present invention is as follows.
1. An additive for molding a ceramic material which consists of a polymer microparticle having an ionic functional group, characterized in that the polymer microparticle exhibits:
   (a) an average particle size between 10 and 150 μm when the polymer microparticle is swollen with ion exchange water until the swollen polymer microparticle reaches a saturated state;
   (b) an ion exchange water absorbing amount between 10 and 60 mL/g at an ordinary pressure; and
   (c) an electroconductivity of 1,500 μS/cm or less at a temperature of 25° C., in a form of aqueous dispersion obtained by dispersing 1 part by mass of the polymer microparticle in 110 parts by mass of ion exchange water.

2. The additive for molding a ceramic material according to 1 above, wherein a content of the ionic functional group in the polymer microparticle is between 1.5 and 9.0 mmol/g.

3. The additive for molding a ceramic material according to 1 or 2 above, wherein the ionic functional group is an acidic functional group neutralized with alkali.

4. The additive for molding a ceramic material according to any one of 1 to 3 above, wherein a content of an adduct of ammonia and/or volatile organic amine of unsaturated monomer containing the polymer microparticle is not more than 5.0% by mass.

5. The additive for molding a ceramic material according to any one of 1 to 4 above, wherein the polymer microparticle is produced by inverse suspension polymerization method.

6. The additive for molding a ceramic material according to 5 above, wherein the inverse suspension polymerization method is a method in which an oil-soluble oxidizing agent and a water-soluble reducing agent are used as a polymerization initiator.

7. The additive for molding a ceramic material according to any one of 1 to 6 above, wherein the polymer microparticle is obtained by polymerizing a monomer mixture comprising, as an indispensable component, one or more kinds selected from (meth)acrylic acid, and 2-(meth)acrylamide-2-methylpropane sulfonic acid.

8. The additive for molding a ceramic material according to 7 above, wherein the monomer mixture further comprises a nonionic vinyl monomer.

9. The additive for molding a ceramic material according to any one of 1 to 8 above, wherein a content of a particle having a size of 200 μm or larger when the polymer microparticle is swollen with ion exchange water until the swollen polymer microparticle reaches a saturated state is 1.5% by mass or less.

10. The additive for molding a ceramic material according to any one of 1 to 9 above, wherein a content of a particle having a size of 5 μm or smaller when the polymer microparticle is dried is 5.0% by mass or less.

11. A production method of a molded ceramic article characterized by using the additive for molding a ceramic material according to any one of 1 to 10 above.

Effect of the Invention

When the polymer microparticle according to the present invention is used as an additive for extrusion molding of a ceramic, it is possible not only to obtain a green ceramic clay excellent in flowability upon extrusion molding, but also to exhibit an excellent performance for a shape-retaining ability of the green ceramic clay after extrusion by virtue of the excellent water absorbing ability of the polymer microparticle.

BRIEF DESCRIPTION OF THE DRAWING

FIG. 1 is a diagram showing an apparatus for measurement of water absorbing amount of polymer microparticle.

EMBODIMENT FOR CARRYING OUT THE INVENTION

The present invention relates to an additive for molding a ceramic material which consists of a polymer microparticle having an ionic functional group, and specifically relates to an additive for molding a ceramic material characterized in that the polymer microparticle exhibits: (a) an average particle size between 10 and 150 μm when the polymer microparticle is swollen with ion exchange water until the swollen polymer microparticle reaches a saturated state, (b) an ion exchange water absorbing amount between 10 and 60 mL/g at an ordinary pressure, and (c) an electroconductivity of 1,500 μS/cm or less at a temperature of 25° C., in a form of aqueous dispersion obtained by dispersing 1 part by mass of the polymer microparticle in 110 parts by mass of ion exchange water.

Hereinafter, the additive for molding a ceramic material of the present invention will be described in detail. It is noted that the term "(meth)acrylic acid" used herein designates an acrylic acid or methacrylic acid in the specification.

The polymer microparticle to be adopted in the present invention is required to have an average particle size in a range between 10 and 150 μm when the polymer microparticle is swollen with ion exchange water until the swollen polymer microparticle reaches a saturated state. The range thereof is preferably between 15 and 100 μm, and more preferably between 20 and 60 μm. Average particle size smaller than 10 μm leads to insufficient lubricating effects, thereby failing to obtain higher flowabilities. This is assumed to be due to a fact that the polymer microparticle is captured into a gap between ceramic particles. Average particle size larger than 150 μm tends to cause agglomerates and the like upon production, and are thus undesirable. Such larger size is also undesirable in that a molded article is then occasionally deteriorated in smoothness at a surface thereof.

Further, the polymer microparticle is required to have an ion exchange water absorbing amount between 10 and 60 mL/g at an ordinary pressure. The range thereof is preferably between 15 and 55 mL/g, and more preferably between 20 and 50 mL/g. Such water absorbing amount less than 10 mL/g is excessively less and leads to insufficient lubricating performances. Then, a water absorbing resin microparticle is to be increased in addition amount required to obtain sufficient lubricating performances. Contrary, such water absorbing amount exceeding 60 mL/g leads to a decreased water amount of green ceramic clay, particularly of binder phases therein, thereby failing to obtain excellent moldabilities. Then, a water amount required for kneading green ceramic clay is also increased, thereby requiring extensive energies for drying them.

Moreover, the polymer microparticle according to the present invention is required to have an electroconductivity of 1,500 μS/cm or less at a temperature of 25° C., in a form of aqueous dispersion obtained by dispersing 1 part by mass of the polymer microparticle in 110 parts by mass of ion exchange water. The electroconductivity is preferably 1,200 μS/cm or less, and more preferably 800 μS/cm or less. Electroconductivity exceeding 1,500 μS/cm leads to prevention of water absorption due to an eluted component which is an electroconductive substance, thereby tending to deteriorate water absorbing ability, and water retaining ability. As a result, green bodies are undesirably made to be insufficient in hardness, shape-retaining ability, and the like.

It is possible to measure an electroconductivity by a commercially available electroconductivity meter. Such a measurement is to be conducted by adding 1 part by mass of a powder of polymer microparticle into 110 parts by mass of ion exchange water, and to stir the mixture for 30 minutes to uniformly disperse the former in the latter, followed by adjustment of the dispersion to a temperature of 25° C. and by insertion of an electrode of the electroconductivity meter into the dispersion.

Hereinafter will be described those substances which cause increase of electroconductivity.

In polymer microparticle neutralized with ammonia and/or amine as described later, free ammonia and/or amine is added to an unsaturated double bond of a residual monomer, thereby occasionally generating a water-soluble organic amine. The thus generated water-soluble organic amine is eluted out of the polymer microparticle when the particle is contacted with water in a manner to decrease an osmotic pressure difference between the interior and the exterior of the particle, thereby causing to decrease a water absorbing amount of the polymer microparticle.

The amount of the above-described ammonia and/or amine adduct of unsaturated monomers can be quantified by dispersing a powder of polymer microparticle into ion exchange water to thereby extract an eluted component which is then dried and dissolved in heavy water, followed by $^1$H-NMR measurement. The quantification can be conducted by calculation based on signals of methylene hydrogens appearing between 2.0 and 3.5 ppm.

In the present invention, the amount of the ammonia and/or volatile organic amine adduct of unsaturated monomers is preferably 5.0% by mass or less, and more preferably 3.0% by mass or less. Amount thereof exceeding 5.0% by mass leads to prevention of water absorption due to an eluted component, thereby tending to deteriorate water absorbing ability, and water retaining ability, similarly to the case of the electroconductivity.

The content of the ionic functional group in the polymer microparticle according to the present invention is preferably between 1.5 and 9.0 mmol/g, and more preferably between 3.0 and 9.0 mmol/g. Amount of ionic functional group less than 1.5 mmol/g tends to cause slower water absorbing speeds, thereby leading to insufficient lubricating performances. Then, dispersibility of the polymer microparticle into water is made to be insufficient, in a manner to form agglomerates in a green ceramic clay, thereby causing occurrence of cracks upon drying a molded article. In turn, amount exceeding 9.0 mmol/g leads to larger absorbances of microwaves upon heating and drying by microwaves, in a manner to cause drying irregularities, to cause occurrence of cracks.

The ionic functional group may be an acidic functional group neutralized with alkali.

Here, the acidic functional group is introduced by using a vinyl-based monomer having an acidic group, such as a carboxylic acid (salt) and sulfonic acid (salt). It is also possible to obtain a neutralized acidic functional group in a manner different from the above, by once obtaining a polymer from alkylester (meth)acrylate or the like, and by saponifying the polymer with an alkali.

As such an alkali it is possible to adopt ammonia or a volatile organic amine. The vinyl monomer having the acidic group is to be neutralized with the alkali, thereby enabling to prepare an aqueous solution containing a vinyl-based monomer mixture excellently dissolved therein.

Specific examples of the alkali for obtaining the volatile organic amine salt include triethylamine, triethanolamine, N,N-dimethylpropylamine, and the like.

It is possible to adopt a publicly known polymerizing method such as aqueous solution polymerization, inverse suspension polymerization, and dispersion polymerization as a method for producing the polymer microparticle according to the present invention. The inverse suspension polymerization is preferable from a standpoint of its ability to readily obtain highly crosslinked spherical microparticles in micron size.

The inverse suspension polymerization is typically one which adopts an oil phase as a dispersion medium and a water phase as a dispersoid, and it is preferable in the present invention that the polymer microparticle is produced by inverse suspension polymerization of a water-in-oil type (W/O type) where a water phase (a aqueous solution of the vinyl-based monomer mixture) is suspended, in shapes of water droplets, in an oil phase (dispersion medium comprising hydrophobic organic solvent) containing a dispersion stabilizer.

In the inverse suspension polymerization, it is possible to adjust the size of microparticle to be obtained, by means of a type and an amount of dispersion stabilizer, a rotational speed of stirring, and the like.

Examples of the hydrophobic organic solvent that forms an oil phase (dispersion medium) in the inverse suspension polymerization according to the present invention include an aliphatic hydrocarbon solvent having 6 or more carbon atoms; an aromatic hydrocarbon solvent such as benzene, toluene, xylene and ethyl benzene; a silicone-based solvent such as octamethylcyclotetrasiloxane, and the like. In particular, hexane, cyclohexane, and n-heptane are suitably used because the solubilities of vinyl-based monomer and water in the solvent are small and they can be removed easily after polymerization.

It is possible to use, as an initiator for the inverse suspension polymerization, a publicly known initiator such as a thermal decomposition type initiator, and a redox type initiator, it is preferable to use the redox type initiator. A redox reaction makes it possible to start a polymerization initiation at a low temperature, increase the concentration of a vinyl-based monomer in a polymerization reaction liquid and increase the polymerization rate. Therefore, the productivity can be improved and the molecular weight of a polymer formed can be higher.

In addition, it is particularly preferable to use a redox-based initiator adopting an oil-soluble oxidizing agent and a water-soluble reducing agent, because polymer microparticle having a narrow distribution of particle sizes can be obtained then without causing agglomerated particles.

As described above, a hydrophobic organic solvent is used as the continuous phase (oil phase) in the inverse suspension polymerization, so that the oil-soluble oxidizing agent means an oxidizing agent dissolvable in such a continuous phase. Further, it is possible to previously dissolve or disperse a dispersion stabilizer in the oil phase.

The oil-soluble oxidizing agent according to the present invention is preferably a compound having an octanol/water partition coefficient (log Pow) provided in Japanese Industrial Standards Z7260-107 or OECD TEST Guideline 107 of preferably −1.4 or more, more preferably 0.0 or more, and further preferably 1.0 or more.

Specific example thereof includes an organic peroxide such as tert-butyl hydroperoxide (log Pow=1.3), di-tert-butyl hydroperoxide, tert-hexyl hydroperoxide, di-tert-amyl peroxide, cumene hydroperoxide (log Pow=2.2), dicumyl peroxide (log Pow=5.5), tert-butyl cumyl peroxide, tert-butyl peroxy pivalate, benzoyl peroxide (log Pow=3.5), and lauroyl peroxide. Among these, tert-butyl hydroperoxide and cumene hydroperoxide are preferable. The particular preferred is cumene hydroperoxide.

Reducing agents known as a reducing agent to be used as a redox type polymerization initiator can be used as the water-soluble reducing agent. Among these, sodium sulfite, sodium hydrogensulfite, and sodium hydrosulfite are preferable. Particularly preferred is sodium hydrosulfite. Since the water-soluble reducing agent as such is deactivated gradually through their contact with air, it is preferable to dissolve the agent in water several minutes before a desired time of starting polymerization and then add it.

In the case where the oil-soluble oxidizing agent and the water-soluble reducing agent are used, it is preferable to firstly supply the water-soluble reducing agent into a reactor and to thereafter supply the oil-soluble oxidizing agent into the reactor, because particles generated then are made to be high in uniformity. It is preferable that after the water-soluble reducing agent is water-solubilized to charge into the reactor, the oil-soluble oxidizing agent is fed within 0.5 to 15 minutes and preferably within 1 to 5 minutes to perform the polymerization.

The whole amount of the oil-soluble oxidizing agent is fed to the reactor over a time of preferably 20 to 120 seconds, and particularly 20 to 60 seconds.

It is undesirable that the feed time of the oil-soluble oxidizing agent is shorter than 20 seconds because, if so, diffusion of the oxidizing agent may fail to catch up with the feed of the oxidizing agent and cause local generation of radicals, which may easily result in troubles such as generation of aggregates. On the other hand, if it is longer than 120 seconds, the oxidizing agent may be partially remained unreacted in the system due to consumption of the reducing agent caused by the decomposition thereof occurring in another mechanism. It is undesirable that the oxidizing agent remains unreacted because, this may cause of troubles, such as generation of aggregates during the following azeotropic dehydration step, the drying step, and the like.

There is no particular limitation on the feed time of a water-soluble reducing agent, and it is preferable to feed it within 15 minutes because the reducing agent is generally easily decomposed due to their contact with the air or the like.

The oil-soluble oxidizing agent is preferably fed to a reactor through a feed port located below the reaction liquid level. Generally, a feed port for a polymerization catalyst is provided at an upper portion of a reactor and a polymerization catalyst is fed at one time or continuously through this port to the reaction liquid level. In the present invention, a method of feeding a polymerization catalyst into a reaction liquid through a pipe connected to a side wall of a reactor is preferable from the viewpoint of uniform diffusion of the catalyst.

There is no particular limitation on the position of the feed port so long as the port is located at a position which is always immersed in a reaction liquid. The feed port is preferably located at a position within ±1 m in terms of the vertical height from the upper end or the lower end of a stirring blade, and is more preferably located at a position within 150 cm.

Examples of the method for feeding the oil-soluble oxidizing agent include a method for feeding it through a pipe leading to a feed port located in a portion below the reaction liquid level, by using a pump or gas pressure of an inert gas such as nitrogen.

The amount of the polymerization initiator to be used may be adjusted according to the types of the vinyl-based monomer and the particle size and molecular weight of the resultant polymer microparticle. The amount of the oil-soluble oxidizing agent is in the range from 0.001 to 0.15 mol, and particularly from 0.003 to 0.07 mol based on 100 mol of the total of the vinyl-based monomer.

Additionally, the ratio of the oil-soluble oxidizing agent and the water-soluble reducing agent is not particularly limited. The molar ratio of the oil-soluble oxidizing agent to the water-soluble reducing agent is preferably 1.0 to 0.25-15.0, and particularly 1.0 to 1.0-10.0.

If the ratio is outside that range, the unfavorable may be occurred. Example thereof includes a generation of aggregates caused by lowering of the reaction rate of monomers, shortening of the chain of a polymer constituting particle, remaining of a catalyst after the completion of polymerization; and the like.

In the inverse suspension polymerization method according to the present invention, a dispersion stabilizer may be used.

Specific examples of the dispersion stabilizer include a macromonomer type dispersion stabilizer, and a nonionic surfactant such as a sorbitan fatty acid ester, a polyglycerol fatty acid ester, a sucrose fatty acid ester, sorbitol fatty acid ester and a polyoxyethylene alkyl ether.

Among these, a macromonomer type dispersion stabilizer is preferable. The macromonomer type dispersion stabilizer is a vinyl-based monomer-derived polymer having, at an end thereof, a radically polymerizable unsaturated group.

Moreover, it is preferable to use a relatively high hydrophobic nonionic surfactant having an HLB of 1 to 8, such as sorbitan monooleate, sorbitan monopalmitate and sorbitan trioleate, together with a macromonomer type dispersion stabilizer. These surfactants may be used singly or in combination of two or more types thereof.

The preferable macromonomer as the above-mentioned macromonomer type dispersion stabilizer are a macromonomer having an α-substituted vinyl group represented by the following formula (1), at an end of a polymer obtained by radical polymerization of a vinyl-based monomer at a temperature range of 150° C. to 350° C., and/or a macromonomer having a (meth)acryloyl group at an end of a polymer derived from a vinyl-based monomer.

$$H_2C\!=\!C(X)\!-\!\qquad(1)$$

(In the formula, X is a monovalent polar group.)

These macromonomers are excellent as a dispersion stabilizer and preferable. The weight average molecular weight of the macromonomer is preferably in the range from 1,000 to 30,000. The macromonomer preferably has both structural units derived from a hydrophilic vinyl-based monomer and a hydrophobic vinyl-based monomer. The structural unit derived from the hydrophobic vinyl-based monomer is preferably a structural unit derived from a (meth)acrylic acid alkyl ester having 8 or more carbon atoms, and the structural unit derived from the hydrophilic vinyl-based monomer is preferably a structural unit derived from a vinyl-based monomers having a carboxyl group.

In particular, when the hydrophilic polymer microparticle is produced by inverse suspension polymerization of a vinyl-based monomer using a macromonomer type dispersion stabilizer, it is preferable to use a multifunctional vinyl-based monomer together with a monofunctional compound. Thereby hydrophilic polymer crosslinked polymer microparticle having improved strength and shape retainability can be obtained.

The dispersion stabilizer is preferably added to a polymerization system after being dissolved or uniformly dispersed in a hydrophobic organic solvent that is a dispersion medium (oil phase).

The amount of the dispersion stabilizer to be used is preferably in the range from 0.1 to 50 parts by weight, more preferably from 0.2 to 20 parts by weight, and further preferably from 0.5 to 10 parts by weight based on 100 parts by weight of the total amount of the vinyl-based monomer in order to obtain a hydrophilic polymer microparticle uniform in particle size while maintaining excellent dispersion stability. If the amount of the dispersion stabilizer used is too small, the dispersion stabilities of the vinyl-based monomer and formed polymer microparticle in the polymerization system becomes poor, and the formed particles easily aggregate, precipitate, and have variation in particle size. On the other hand, if the amount of the dispersion stabilizer used is too large, the amount of the microparticle (having size of 1 μm or smaller) by-produced may be increased.

The vinyl-based monomer to be used in the inverse suspension polymerization according to the present invention is not particularly limited so long as the same is radically polymerizable. Example thereof includes a hydrophilic vinyl-based monomer having a hydrophilic group such as a carboxyl group, an amino group, a phosphoric group, a sulfonic group, an amide group, a hydroxyl group, and a quaternary ammonium group.

Specific examples of the vinyl-based monomer include a vinyl-based monomer having a carboxyl group or its (partially) alkali-neutralized product, such as (meth)acrylic acid, crotonic acid, itaconic acid, maleic acid, fumaric acid, monobutyl itaconate, monobutyl maleate and cyclohexanedicarboxylic acid; a vinyl-based monomer having an amino group or its (partially) acid-neutralized product or its (partially) quaternary product, such as N,N-dimethylaminoethyl (meth)acrylate, N,N-diethylaminoethyl (meth)acrylate, N,N-dimethylaminopropyl (meth)acrylate, and N,N-dimethylaminopropyl (meth)acrylamide; N-vinylpyrrolidone, acryloylmorpholine; a vinyl-based monomer having a phosphoric acid group, or its (partially) acid-neutralized product, such as acid phosphoxyethyl methacrylate, acid phosphoxypropyl methacrylate, and 3-chloro-2-acid phosphoxypropyl methacrylate; a vinyl-based monomer having a sulfonic acid group or phosphonic acid group, or its (partially) alkali-neutralized product, such as 2-(meth)acrylamide-2-methylpropanesulfonic acid, 2-sulfoethyl (meth)acrylate, 2-(meth)acryloylethanesulfonic acid, allylsulfonic acid, styrene sulfonic acid, vinylsulfonic acid, allylphosphonic acid, and vinylphosphonic acid; a nonionic hydrophilic monomer such as (meth)acrylamide, N,N-dimethyl acrylamide, N-isopropyl acrylamide, N-methylol (meth)acrylamide, N-alkoxymethyl (meth)acrylamide, (meth)acrylonitrile, hydroxyethyl (meth) acrylate, hydroxypropyl (meth)acrylate, methoxy polyethyleneglycol mono (meth)acrylate, and the like. These compounds may be used singly or in combination of two or more types thereof.

Among these, an acidic functional group containing vinyl monomer such as (meth)acrylic acid and 2-(meth)acrylamide-2-methylpropanesulfonic acid; N,N-dimethylaminoethyl (meth)acrylate, and a nonionic vinyl-based monomer such as (meth)acrylamide, hydroxyethyl (meth)acrylate and methoxy polyethyleneglycol mono (meth)acrylate are preferable because these monomers are highly hydrophilic and suitable for the inverse suspension polymerization.

Moreover, an the inverse suspension polymerization using at least one compound selected from the group consisting of (meth)acrylic acid and 2-acrylamide-2-methylpropanesulfonic acid is preferable from the viewpoint that polymerizability is excellent and resulting polymer microparticle is excellent in water absorbing ability and water retaining ability.

In the present invention, a multifunctional vinyl-based monomer having two or more radically polymerizable unsaturated groups may be used as a vinyl-based monomer together with at least one of the above-mentioned monofunctional hydrophilic vinyl-based monomer for the inverse suspension polymerization.

Therefore, the "vinyl-based monomer" according to the present invention is a general term for the monofunctional vinyl-based monomer and the multifunctional vinyl-based monomer.

The multifunctional vinyl-based monomer is not particularly limited so long as it has two or more groups radically polymerizable with the above-mentioned hydrophilic vinyl-based monomer, and specific example thereof includes a di- or tri-(meth)acrylate of a polyol, such as polyethylene glycol di(meth)acrylate, polypropylene glycol di(meth)acrylate, glycerin tri(meth)acrylate, trimethylolpropane tri(meth)acrylate, and a tri(meth)acrylate of a modified trimethylolpropane ethylene oxide; a bisamide such as methylenebis(meth)acrylamide; divinyl benzene, allyl (meth)acrylate, and the like. These compounds may be used singly or in combination of two or more types thereof.

Among these, polyethylene glycol diacrylate and methylene bis(meth)acrylamide are suitably used as the multifunctional vinyl-based monomer because it excels in solubility in a mixed liquid of water and a base-forming hydrophilic vinyl-based monomer and it is advantageous in being used in an amount increased for obtaining a high degree of crosslinking. The particular preferred is polyethylene glycol di(meth)acrylate.

The amount of the multifunctional vinyl-based monomer to be used depends on the type of the vinyl-based monomer to be used and the intended application of the resulting microparticle. When the polymer microparticle is required to have crosslinked characteristics, the amount thereof is preferably in the range from 0.1% to 30% by mol, and more preferably from 0.5% to 10% by mol based on the total amount of monomers to be used. When the multifunctional vinyl-based monomer is used in an amount of 0.1% by mol or more, the strength of the resulting microparticle is ensured. When the multifunctional vinyl-based monomer is used in an amount of 30% by mol or less, sufficient water absorbing ability can be obtained.

The content of a particle having a size of 200 μm or larger when the polymer microparticle according to the present invention is swollen with ion exchange water until the swollen polymer microparticle reaches a saturated state is preferably 1.5% by mass or less, and more preferably 1.0% by mass or less. The content of more than 1.5% by mass occasionally and undesirably leads to occurrence of defects in appearance such as cracks of ceramic products, due to presence of particles having larger size.

Further, the content of a particle having a size of 5 μm or smaller when the polymer microparticle according to the present invention is dried is preferably 5.0% by mass or less, and more preferably 3.0% by mass or less. A small particle having a size smaller than 5 μm fails to exhibit a sufficient lubricating effect in itself, due to such a reason that the particle is captured into gaps between ceramic particles. Therefore, particle content larger than 5.0% by mass occasionally leads to insufficient lubricating abilities. Moreover, the presence of the particle leads to a correspondingly decreased amount of effective polymer microparticle, thereby also bringing about an undesirable affection on shape-retaining ability of ceramic.

The additive for molding a ceramic material of the present invention is to be kneaded into a green ceramic clay, together with a ceramic powder, a binder, water, and the like. The additive is preferably used in an amount from 0.1% to 10% by mass, and more preferably from 0.1% to 5% by mass, as a ratio of the polymer microparticle relative to the green ceramic clay. Usage amount not less than 0.1% by mass enables to exhibit effects for simultaneously establishing a moldability and a shape-retaining ability, while usage amount not more than 10% by mass rarely obstructs an interaction between binder molecules to considerably deteriorate a shape-retaining ability, a strength of the resulting molded article, and the like.

In ceramic molding, it is typical to firstly form a molded body by any of various molding methods, and to subsequently conduct a dehydration treatment in a drying process by subjecting the molded body to a hot air or to irradiation of microwaves. When the additive for molding a ceramic material of the present invention is adopted, it is possible to obtain an excellent flowability of a green ceramic clay to thereby improve a moldability thereof, and, after molding, the polymer microparticle quickly absorb a water content therearound, thereby ensuring a shape-retaining ability of a molded article in a drying process onward.

The ceramic powder to be used in the present invention is not particularly limited so long as the same is water-based and moldable. Specific example thereof includes an oxide-based ceramics such as alumina, cordierite, mullite, silica, zirconia and titania; a nonoxide-based ceramics such as silicon carbide, silicon nitride, aluminum nitride, boron nitride, titanium nitride and titanium carbide.

Further, the binder to be contained in the kneaded ceramic composition is not particularly limited so long as the same is water-based and utilizable. Example thereof includes cellulose derivatives such as methyl cellulose, hydroxypropylmethyl cellulose and hydroxypropylethyl cellulose; and a synthetic polymer compound such as polyacrylic acid, polyacrylamide and polyvinyl alcohol; and the like. Among the above, cellulose derivatives are widely used in extrusion molding.

It is noted that, in the present specification: an average particle size when the polymer microparticle is swollen with ion exchange water until the swollen polymer microparticle reaches a saturated state; an ion exchange water absorbing amount of the polymer microparticle; a ratio of a particle having a size of 200 μm or larger when the swollen polymer microparticle reaches a saturated state; and a content of a particle having a size of 5 μm or smaller when the polymer microparticle is dried; all refer to values measured or obtained by those applicable techniques described in the following paragraphs of Examples, respectively.

EXAMPLES

The present invention will be specifically explained using Examples hereinafter. In the following description, "part" means "part by mass", and "%" means "% by mass".

Production Example 0

Production of Macromonomer Composition UM-1

The temperature of an oil jacket of a 1,000-mL pressuring stirring vessel type reactor with the oil jacket was kept at a temperature of 240° C.

A monomer mixture liquid prepared in proportions of 75.0 parts of lauryl methacrylate (hereinafter referred to as "LMA") and 25.0 parts of acrylic acid (hereinafter referred to as "AA") as a monomer, 10.0 parts of methyl ethyl ketone as a polymerization solvent, and 0.45 part of di-tert-butyl peroxide as a polymerization initiator was charged into a tank for starting material.

Feed of the monomer mixture liquid in the tank for starting material to a reactor was started, and the feed of the monomer mixture liquid and extraction of a reaction mixture liquid were carried out so that the weight of the contents within the reactor would be 580 g and the average residence time would be 12 minutes. The temperature in the reactor and the pressure in the reactor were adjusted to 235° C. and 1.1 MPa, respectively. The reaction mixture liquid extracted from the reactor was depressurized to 20 kPa and continuously fed to a thin film evaporator maintained at 250° C. Thereby a macromonomer composition from which a monomer, a solvent and the like were distilled was discharged. The monomer, the solvent and the like that were distilled were cooled with a condenser and collected as a distillate. A time when 60 minutes had elapsed from a time when the temperature in the reactor had become stable at 235° C. after the start of the feed of the monomer mixture liquid was defined as a collection starting point, from which the reaction was continued for 48 minutes and then a macromonomer composition UM-1 was collected. During this period, 2.34 kg of the monomer mixture liquid was fed to the reactor, and 1.92 kg of the macromonomer composition was collected from the thin film evaporator. Moreover, 0.39 kg of the distillate was collected in a distillation tank.

The distillate was analyzed by gas chromatography, and it was found that 100 parts by weight of the distillate contained 31.1 parts of LMA, 16.4 parts of AA, and 52.5 parts of the solvent and others.

From the amount and the composition of the monomer mixture liquid fed, the amount of the macromonomer composition collected, and the amount and the composition of distillate collected, the reaction rate of the monomer was calculated to be 90.2%, and the constitutional monomer composition ratio of the macromonomer composition UM-1 was calculated to be LMA to AA=76.0 to 24.0 (weight ratio).

The molecular weight of the macromonomer composition UM-1 was measured by gel permeation Chromatography (hereinafter referred to as "GPC") using tetrahydrofuran as an eluate and the polystyrene-equivalent weight average molecular weight (hereinafter referred to as "Mw") and the polystyrene-equivalent number average molecular weight (hereinafter referred to as "Mn") were 3,800 and 1,800, respectively. Additionally, the concentration of terminal ethylenically unsaturated bond in the macromonomer composition was determined through $^1$H-NMR measurement of the macromonomer composition. From the concentration of terminal ethylenically unsaturated bond obtained by $^1$H-NMR measurement, Mn obtained by GPC, and the constitutional monomer ratio, the introduction ratio of the terminal ethylenically unsaturated bond of the macromonomer composition UM-1 was calculated to be 97%. The solid concentration of a residue after heating the sample at 150° C. for 60 minutes was 98.3%.

As to starting materials including a monomer, a polymerization solvent, a polymerization initiator and the like, commercially available industrial products were used as received without performing any treatment, such as purification.

Production Example 1

Production of Polymer Microparticle A-1

For a polymerization reaction was used a reactor, equipped with a stirring mechanism consisting of a pitched paddle stirring blade and two vertical baffles and further equipped with a thermometer, a reflux condenser, and a nitrogen introduction tube. The nitrogen introduction tube is separated into two branches at the outside of the reactor and has a configuration capable of feeding nitrogen through one branch and a polymerization catalyst through the other by using a pump. The nitrogen introduction tube is connected to a wall of the reactor at an almost the same height as the upper end of the stirring blade.

A reactor was charged with 1.5 part of UM-1 and 2.0 parts of sorbitan trioleate ("REODOL SP-030V" manufactured by KAO Corp.) as a dispersion stabilizer and 160.0 parts of n-heptane as a polymerization solvent, which were stirred and mixed while the solution was kept at a temperature of 40° C., so that an oil phase was prepared. The oil phase was stirred at 40° C. for 30 minutes and then was cooled down to 15° C.

On the other hand, into another container were charged 70.0 parts of AA, 75.0 parts of an aqueous solution of acrylamide at a concentration of 40% (hereinafter referred to as "40% AMD"), 4.2 parts of polyethylene glycol diacrylate ("ARONIX M-243" manufactured by TOAGOSEI CO., LTD., average molecular weight 425), 0.02 part of p-methoxyphenol and 50.0 parts of ion exchange water, which were stirred to be dissolved uniformly. Furthermore, while the mixed liquid was cooled so that the temperature thereof would be kept at 40° C. or lower, 49.6 parts of a 25% ammonia water was added slowly to neutralize the mixed liquid. Thus, a monomer mixed liquid was obtained.

After setting the stirring revolution speed to be 650 rpm, an amount of 40% by weight (99.5 parts) of the resultant monomer mixed liquid was charged into the reactor, so that a dispersion liquid was prepared in which the monomer mixed liquid was dispersed in the oil phase. The temperature in the reactor was kept at 20° C. and nitrogen was blown into the dispersion liquid to remove oxygen in the reactor. At a time when 1 hour and 30 minutes had passed since the charging of the monomer mixture, an aqueous solution of 0.04 part of sodium hydrosulfite and 1.0 part of ion exchange water was added through an addition port mounted at the upper portion of the reactor. Three minutes later, a solution prepared by diluting 0.02 part of a 80% solution of cumene hydroperoxide ("Percumyl H80" manufactured by NOF Corp.) with 3.0 parts of n-heptane was fed with a pump through the nitrogen introduction tube. The feed was performed in 30 seconds. The temperature in the reactor increased immediately after the start of the feed, and this confirmed that polymerization was initiated. The increased internal temperature reached the peak in about 40 seconds, and the temperature was 64.3° C.

The reaction liquid was cooled to a temperature of 20° C., and then remaining 60% by weight (149.3 parts) of the monomer mixed liquid obtained above was added to the reaction liquid and dispersed. At a time when 30 minutes had passed since the monomer mixture was charged, the stirring revolution speed was increased to 980 rpm. After that, an aqueous solution of 0.06 part of sodium hydrosulfite and 1.0 part of ion exchange water was immediately added through an addition port mounted at the upper portion of the reactor. Three minutes later, a solution prepared by diluting 0.03 part of "Percumyl H80" with 3.0 parts of n-heptane was fed with a pump through the nitrogen introduction tube. The feed was performed in 45 seconds. The temperature in the reactor increased immediately after the start of the feed, and this confirmed that polymerization was initiated. The increased internal temperature reached the peak in about 40 seconds, and the temperature was 65.2° C.

Then, the reaction liquid was cooled down to 15° C., followed by addition of an aqueous solution of 0.05 part of sodium hydrosulfite as an additional catalyst and 2.0 parts of ion exchange water from the addition port mounted at the upper portion of the reactor, and 3 minutes thereafter, further followed by addition of a solution obtained by diluting 0.02 part of tert-butyl hydroperoxide (product name "PERBUTYL H69" manufactured by NOF Corp.) with 2.0 parts of ion exchange water from the same addition port mounted at the upper portion of the reactor. At this time, the temperature of the reaction liquid was elevated to 24.9° C.

Further added into the reaction liquid was an aqueous solution obtained by dissolving 0.04 part of azobis cyanovaleric acid into 1.7 part of 0.4% by weight of ammonia water in a manner to elevate the temperature, thereby azeotropically boiling the water contained in the particle and n-heptane to conduct dehydration up to a dehydration rate of 98%, followed by centrifugal separation and decantation to thereby remove a n-heptane phase. Repeated again after addition of n-heptane in the same amount as the removed n-heptane phase followed by stirring, was the same operation to thereby remove the added n-heptane phase, followed by volatilization of the solvent by a forced-air dryer, thereby obtaining polymer microparticle A-1.

Production Example 2

Production of Polymer Microparticle A-2

Conducted was the same production procedure as Production Example 1, except that a monomer aqueous solution containing 50.0 parts of AA, 125.0 parts of 40% AMD, 3.6 parts of "ARONIX M-243", 0.02 part of p-methoxyphenol, 30.0 parts of ion exchange water, and 35.4 parts of 25% ammonia water was used, and that the rotational speed of stirring was set at 610 rpm, thereby obtaining a dry powder of polymer microparticle A-2.

Production Example 3

Production of Polymer Microparticle A-3

Conducted was the same production procedure as Production Example 1, except that a monomer aqueous solution containing 70.0 parts of AA, 30.0 parts of methoxypolyethylene glycol monoacrylate (product name "AME-400" manufactured by NOF Corp.), 6.2 parts of "ARONIX M-243", 0.02 part of p-methoxyphenol, 95.0 parts of ion exchange water, and 49.6 parts of 25% ammonia water was used, and that the rotational speed of stirring was set at 670 rpm, thereby obtaining a dry powder of polymer microparticle A-3.

Production Example 4

Production of Polymer Microparticle A-4

Conducted was the same production procedure as Production Example 1, except that a monomer aqueous solution containing 70.0 parts of 2-acrylamide-2-methylpropane sulfonic acid (hereinafter referred to as "ATBS"), 75.0 parts of 40% AMD, 9.7 parts of "ARONIX M-243", 0.02 part of p-methoxyphenol, 80.0 parts of ion exchange water, and 17.2 parts of 25% ammonia water was used, and that the rotational speed of stirring was set at 580 rpm, thereby obtaining a dry powder of polymer microparticle A-4.

Production Example 5

Production of Polymer Microparticle A-5

Conducted was the same production procedure as Production Example 1, except that 1.5 part of UM-1 and 2.0 parts of sorbitan monooleate (product name "RHEODOL AO-10V" manufactured by Kao Corp.) were used as the dispersion stabilizer, that a monomer aqueous solution using 100 parts of AA, 6.0 parts of "ARONIX M-243", 81.0 parts of ion exchange water, and 80.3 parts of 25% ammonia water was used, and that the rotational speed of stirring was set at 610 rpm, thereby obtaining a dry powder of polymer microparticle A-5.

Production Example 6

Production of Polymer Microparticle A-6

Conducted was the same production procedure as Production Example 2, except that the rotational speed of stirring was lowered to 300 rpm, thereby obtaining a dry powder of polymer microparticle A-6.

Production Example 7

Production of Polymer Microparticle A-7

Conducted was the same production procedure as Production Example 2, except that 1.5 part of UM-1 and 2.0 parts of "RHEODOL AO-10V" were used as the dispersion stabilizer, and that the rotational speed of stirring was set at 560 rpm, thereby obtaining a dry powder of polymer microparticle A-7.

Production Example 8

Production of Polymer Microparticle A-8

Conducted was the same production procedure as Production Example 1, except that a monomer aqueous solution containing 10 parts of AA, 225.0 parts of 40% AMD, 3.1 parts of "ARONIX M-243", and 7.1 parts of 25% ammonia water, without adding ion exchange water was used, and that the rotational speed of stirring was set at 660 rpm, thereby obtaining a dry powder of polymer microparticle A-8.

Production Example 9

Production of Polymer Microparticle B-1

Conducted was the same production procedure as Production Example 1, except that 1.5 part of UM-1 and 2.0 parts of "RHEODOL AO-10V" were used as the dispersion stabilizer, that a monomer aqueous solution using 100 parts of AA, 4.2 parts of "ARONIX M-243", 88.0 parts of ion exchange water, and 70.8 parts of 25% ammonia water was used, and that the rotational speed of stirring was set at 730 rpm, while excluding addition of the additional catalyst, thereby obtaining a dry powder of polymer microparticle B-1.

Production Example 10

Production of Polymer Microparticle B-2

Conducted was the same production procedure as Production Example 1, except that the amount of "ARONIX M-243" was changed to 1.7 part in the composition of the monomer aqueous solution, and that the rotational speed of stirring was set at 690 rpm, thereby obtaining a dry powder of polymer microparticle B-2.

Production Example 11

Production of Polymer Microparticle B-3

Conducted was the same production procedure as Production Example 2, except that the rotational speed of stirring was set at 1,800 rpm, thereby obtaining a dry powder of polymer microparticle B-3.

Production Example 12

Production of Polymer Microparticle B-4

Conducted was the same production procedure as Production Example 2, except that the rotational speed of stirring was set at 220 rpm, thereby obtaining a dry powder of polymer microparticle B-4.

Production Example 13

Production of Polymer Microparticle B-5

Conducted was the same production procedure as Production Example 2, except that the amount of "ARONIX M-243" was changed to 14.8 parts in the composition of the monomer aqueous solution, and that the rotational speed of stirring was set at 540 rpm, thereby obtaining a dry powder of polymer microparticle B-5.

Example 1

Weighed as a ceramic starting material powder were talc, kaolin, alumina, aluminum hydroxide, and silica, in amounts listed in Table 1, respectively. Methyl cellulose was added thereinto as a binder, followed by dry blending. Further added thereinto were the polymer microparticle A-1, followed by continuing dry blending.

Progressively added into the above obtained powder mixture was ion exchange water in small amounts, while kneading the mixture by a kneader. As the kneading was progressed, the methyl cellulose was dissolved to thereby increase an electric current value of the kneader in a manner to finally reach a constant value, at which time the kneading was judged to be completed, and the kneaded matter was taken out of the kneader. This kneaded matter was pushed into a piston and extruded therefrom into a columnar shape under a condition of room temperature, thereby obtaining an extrusion molded cordierite-based ceramic article having general dimensions of 415 mm×50 mm.

The thus obtained molded article was subjected to irradiation of electromagnetic waves of 0.5 kW at 2.45 GHz for 5 minutes and dried thereby up to a dehydration rate of 50% to 60%, followed by heating and drying in a hot-air dryer at a temperature of 110° C. for 2 hours, thereby achieving a dehydration rate of about 100%.

TABLE 1

| Starting material | Parts |
| --- | --- |
| Talc | 40.0 |
| Kaolin | 18.5 |
| Alumina | 14.0 |
| Aluminum hydroxide | 15.0 |
| Silica | 12.5 |
| Methyl cellulose | 5.0 |
| Polymer microparticle | 1.0 |
| Ion exchange water | 50.0 |

(Evaluation of Moldability)

The molded article (before drying) obtained by the above extrusion molding was visually observed about its appearance, and evaluated according to the following criteria. Results are shown in Table 2.

Good: free of any significant defects in appearance.

Fair: slight roughness was seen at part of surface.

Poor: cracks or roughness were seen over the entire surface.

(Evaluation of Shape-Retaining Ability)

The molded article obtained by the above extrusion molding was visually observed about its appearance before and after drying, and evaluated according to the following criteria. Results are shown in Table 2.

Good: columnar shape was satisfactorily kept.

Poor: deformed, while failing to keep columnar shape.

(Evaluation of Appearance)

The molded article after drying was visually observed about its appearance, and evaluated according to the following criteria. Results are shown in Table 2.

Good: free of any significant defects in appearance.

Fair: slight crack or slight irregularity was seen at part of surface.

Poor: significant irregularities were seen on surface, or appearance defects such as local shrinkage or the like were seen on surface.

Examples 2 to 8

These Examples were each evaluated about moldability, shape-retaining ability, and appearance by the same procedure as Example 1, except for adoption of polymer microparticles A-2 to A-8, respectively. Results are shown in Table 2.

Comparative Examples 1 to 5

These Comparative Examples were each evaluated about moldability, shape-retaining ability, and appearance by the same procedure as Example 1, except for adoption of polymer microparticles B-1 to B-5, respectively. Results are shown in Table 3.

TABLE 2

| | | Example 1 | Example 2 | Example 3 | Example 4 | Example 5 | Example 6 | Example 7 | Example 8 |
|---|---|---|---|---|---|---|---|---|---|
| Polymer microparticle | | A-1 | A-2 | A-3 | A-4 | A-5 | A-6 | A-7 | A-8 |
| Composition | AA | 70 | 50 | 70 | — | 100 | 50 | 50 | 10 |
| | ATBS | — | — | — | 70 | — | — | — | — |
| | AMD | 30 | 50 | — | 30 | — | 50 | 50 | 90 |
| | AME-400 | — | — | 30 | — | — | — | — | — |
| | M-243 | 4.2 | 3.6 | 6.2 | 9.7 | 6.0 | 3.6 | 3.6 | 3.1 |
| | 25% ammonia water | 49.6 | 35.4 | 49.6 | 17.2 | 80.3 | 35.4 | 35.4 | 7.1 |
| Polymerization initiator | | Redox | Redox | Redox | Redox | Redox | Redox | Redox | Redox |
| Rotational speed | | 650 | 610 | 670 | 580 | 610 | 300 | 560 | 660 |
| Diameter of particle saturatedly swollen with water ($\mu$m) | | 43 | 51 | 32 | 28 | 53 | 126 | 51 | 42 |
| Water absorbing amount (mL/g) | | 47 | 45 | 25 | 18 | 49 | 51 | 45 | 31 |
| Electroconductivity ($\mu$S/cm) | | 170 | 153 | 260 | 78 | 615 | 205 | 150 | 72 |
| Base adduct amount (wt %) | | 1.2 | 0.8 | 4.3 | 0.5 | 4.1 | 1.8 | 0.8 | 0.9 |
| Amount of neutralized acidic functional group (mmol/g) | | 6.3 | 4.7 | 6.2 | 2.2 | 9.5 | 4.7 | 4.7 | 1.0 |
| Residue from 200 $\mu$m sieve (wt %) | | 0.23 | 0.35 | 0.13 | 0.03 | 0.36 | 2.34 | 0.26 | 0.32 |
| Amount of particle of 5 $\mu$m or smaller in dried state (wt %) | | 0.40 | 0.32 | 0.56 | 0.12 | 0.33 | 0.18 | 6.40 | 0.35 |
| Moldability | | Good | Good | Good | Good | Good | Good | Fair | Fair |
| Shape-retaining ability | | Good | Good | Good | Good | Good | Good | Good | Good |
| Appearance | | Good | Good | Good | Good | Fair (crack) | Fair (irregularities) | Good | Fair (crack) |

TABLE 3

| | | Comparative Example 1 | Comparative Example 2 | Comparative Example 3 | Comparative Example 4 | Comparative Example 5 |
|---|---|---|---|---|---|---|
| Polymer microparticle | | B-1 | B-2 | B-3 | B-4 | B-5 |
| Composition | AA | 100 | 70 | 50 | 50 | 50 |
| | ATBS | — | — | — | — | — |
| | AMD | — | 30 | 50 | 50 | 50 |
| | AME-400 | — | — | — | — | — |
| | M-243 | 4.2 | 1.7 | 3.6 | 3.6 | 14.8 |
| | 25% ammonia water | 70.8 | 49.6 | 35.4 | 35.4 | 35.4 |
| Polymerization initiator | | Redox | Redox | Redox | Redox | Redox |
| Rotational speed | | 730 | 690 | 1800 | 220 | 540 |
| Diameter of particle saturatedly swollen with water ($\mu$m) | | 47 | 48 | 8 | 168 | 36 |
| Water absorbing amount (mL/g) | | 52 | 93 | 44 | 47 | 9 |
| Electroconductivity ($\mu$S/cm) | | 1620 | 651 | 183 | 178 | 164 |
| Base adduct amount (wt %) | | 8.5 | 2.9 | 0.9 | 1.0 | 1.2 |
| Amount of neutralized acidic functional group (mmol/g) | | 8.6 | 6.5 | 4.6 | 4.6 | 4.2 |
| Residue from 200 $\mu$m sieve (wt %) | | 0.17 | 0.82 | 0.01 | 3.90 | 0.18 |
| Amount of particle of 5 $\mu$m or smaller in dried state (wt %) | | 0.35 | 0.48 | 88 | 0.38 | 0.82 |
| Moldability | | Good | Poor | Poor | Poor | Fair |
| Shape-retaining ability | | Poor | Good | Good | Good | Poor |
| Appearance | | Poor (shrinkage) | Good | Good | Poor (irregularities) | Poor (shrinkage) |

Analysis items of polymer microparticle for the above examples are described as follows:

(1) Solid Concentration

About 1 g of an applicable measurement sample was weighed (a), followed by measurement (b) of a residue after drying the sample at a temperature of 150° C. for 60 minutes by a windless dryer, thereby calculating a solid concentration of the sample by the following equation. Used for the measurement was a weighing bottle. The other manipulations were conducted according to JIS K 0067-1992 (Test methods for loss and residue of chemical products).

Solid concentration(%)=(b/a)×100

(2) Water Absorbing Amount

The amount of water absorption was measured according to the following method. The measuring device is illustrated in FIG. 1.

The measuring device is composed of <1> to <3> shown in FIG. 1.

<1> is consisting of a burette 1 having a branch pipe for air ventilation, a pinch cock 2, a silicone tube 3, and a polytetrafluoroethylene tube 4.

In <2>, a supporting cylinder 8 having many holes in its bottom is mounted on a funnel 5, and a filter paper 10 for device is mounted thereon.

In <3>, a sample 6 of the polymer microparticles is inserted into two filter papers 7 for fixing sample, and the filter papers for fixing sample are fixed with an adhesive tape 9. All the filter papers to be used are "ADVANTEC No. 2" having an inner diameter of 55 mm.

<1> and <2> are linked with the silicone tube 3.

The levels with respect to the burette 1 of the funnel 5 and the supporting cylinder 8 are fixed, and the lower end of the polytetrafluoroethylene tube 4 disposed within the burette branch pipe and the bottom of the supporting cylinder 8 are set to be at the same level (dotted line in FIG. 1).

The measuring method is described below.

The pinch cock 2 in <1> was released, and ion exchange water was charged from the top of the burette 1 through the silicone tube 3 so that the space from the burette 1 to the filter paper 10 for device was filled with ion exchange water 12. Subsequently, the pinch cock 2 was closed and air was removed through the polytetrafluoroethylene tube 4 connected to the burette branch pipe with a rubber stopper. Thus, a condition was obtained such that ion exchange water 12 was continuously fed from the burette 1 to the filter paper 10 for device.

After that, excess ion exchange water 12 which oozed from the filter paper 10 for device was removed, and then a read graduation (a) of the burette 1 was recorded.

A dry powder was sampled in an amount of 0.1 to 0.2 g, and then the powder was placed uniformly on the center of the filter paper 7 for fixing sample as illustrated in <3>. Another filter paper was used to sandwich the sample and the two filter papers were adhered with an adhesive tape 9 to fix the sample. The filter papers between which the sample was fixed were put on the filter paper 10 for device as illustrated in <2>.

Subsequently, a read graduation (b) of the burette 1 after a lapse of 30 minutes from a time when a lid 11 was put on the filter paper 10 for device was recorded.

The total amount (c) of the water absorption of the sample and the water absorption of the two filter papers 7 for fixing sample was calculated by (a-b). In the same manner, the water absorbing amount (d) of only the two filter papers 7 containing no polymer microparticle was measured.

The above-mentioned operations were performed and the water absorbing amount was calculated from the following equation. As to the solid concentration to be used for the calculation, a value measured by the method (1) was used.

Water absorbing amount(mL/g)=(c−d)/{Weight of sample(g)×(Solid concentration(%)/100)}

(3) Water-Swollen Particle Size

To 0.02 g of a sample for measurement was added 20 ml of ion exchange water, followed by shaking well. Thus, the sample was dispersed uniformly. For a dispersion liquid resulting from dispersion continued for 30 minutes or more in order to bring the polymer microparticles into a water-saturated-swollen state, the particle size distribution was measured after one-minute application of ultrasonic wave by using a laser diffraction scattering type particle size distribution analyzer "MT-3000" manufactured by NIKKISO CO., LTD. Ion exchange water was used as a circulated dispersion medium used in the measurement and the refractive index of the dispersion was adjusted to 1.53. The median diameter (μm) was calculated from the particle size distribution on volume basis obtained by the measurement, and it was defined as a water-swollen particle size.

(4) Measurement of Amount of Particle Having Water-Swollen Particle Size of 200 μm or Larger (by Wet Sieving Residue Method)

Measurement was performed in accordance with JIS K 0069-1992 (test method for sieving of chemical products).

A sample in an amount corresponding to 25 g in terms of solid concentration was weighed and ethanol was added thereto in the same amount as the sample to loosen well. Then the liquid was poured slowly into 3.0 liters of ion exchange water while stirring and stirred for 30 minutes to prepare a water-swollen dispersion liquid of the sample. After confirmation of the uniform dispersion, the dispersion liquid was poured onto a sieve having a diameter of 70 mm and a mesh opening of 200 μm and allowed to pass therethrough. The residue on the sieve was washed with a sufficient amount of water while taking care that the residue does not spill off. Subsequently, the sieve after measurement was dried in a circulation dryer at a temperature of 150° C. for 30 minutes and cooled in a desiccator, and then the weight of the sieve after drying (the total weight of the sieve and the residue) was measured.

The wet sieve residue (%) calculated by the following formula was defined as the amount of particle having a water-swollen particle size of 200 μm or larger. Operations other than those described above were performed in accordance with JIS K 0069-1992 (test method for sieving of chemical products).

Wet sieve residue(%)=[(Weight of sieve after test−Weight of sieve)/{(Weight of sample used×(Solid concentration/100))}]×100

(5) Content Ratio of Polymer Microparticle Having Size of 5 μm or Smaller in Dry State of Particle:

Each product powder was dispersed in n-heptane containing an emulsifier, followed by filtration by a membrane filter having a pore size of 5 μm.

The cake on the filter was taken out, and the same procedure was repeated until the new filtrate was fully made to be free of turbidity. Finally, all the filtrates were subjected to centrifugal separation to thereby collect therefrom microparticles of 5 μm or smaller, while washingly removing the emulsifier upon centrifugal separation. The thus separated microparticles of 5 μm or smaller were measured for dry weight thereof, thereby calculating a contained amount at issue.

All Examples 1 to 8 adopting the polymer microparticle according to the present invention exhibited excellent performances in moldability and in shape-retaining ability after molding. Among them, excellent results were obtained in addition to appearances of molded articles, respectively, in Examples 1 to 4 each having preferable ranges for all of the amount of ionic functional groups, the contained amount of particles having sizes of 200 μM or smaller, and the contained amount of microparticles having sizes of 5 μm or smaller.

Contrary, Comparative Example 3 where the size of particle saturatedly swollen with water were small, was insufficient in lubricating effect to result in an inferior moldability, and Comparative Example 4 where the size was rather large, additionally resulted in inferior smoothness of a surface of molded article due to affection of the larger particle.

Further, Comparative Example 2 where the water absorbing amount of the polymer microparticle was large, was insufficient in moldability, whereas Comparative Example 5 where the water absorbing amount was small, resulted in inferior shape-retaining ability because the contained water amount of a binder phase after molding was large so that the green ceramic clay had a lower hardness.

Moreover, also Comparative Example 1 where the electroconductivity was high due to omission of addition of the additional catalyst, failed to obtain a sufficient hardness of the green ceramic clay, thereby exhibiting an insufficient shape-retaining ability.

INDUSTRIAL APPLICABILITY

The polymer microparticle according to the present invention is excellent in water absorptivity, thereby enabling to exhibit a sufficient water absorbing ability even in a green ceramic clay when the polymer microparticle is used as an additive for molding a ceramic material. This enables to simultaneously and highly establish a higher flowability of the green ceramic clay upon molding such as extrusion molding and a higher shape-retaining ability after extrusion, in a manner to effectively obtain a highly precise molded article with excellent reproducibility.

EXPLANATION OF THE REFERENCE NUMBERS

1: burette, 2: pinch cock, 3: silicone tube, 4: polytetrafluoroethylene tube, 5: funnel, 6: sample (polymer microparticle), 7: filter paper for fixing sample (polymer microparticle), 8: supporting cylinder, 9: adhesive tape, 10: filter paper for device, 11: lid, 12: ion exchange water

What is claimed is:

1. An additive comprising a polymer microparticle having an ionic functional group, wherein the polymer microparticle has:
   (a) an average particle size between 10 and 150 μm when the polymer microparticle is swollen with ion exchange water until the swollen polymer microparticle reaches a saturated state;
   (b) an ion exchange water absorbing amount between 10 and 60 mL/g at an ordinary pressure; and
   (c) an electroconductivity of 1,500 μS/cm or less at a temperature of 25° C., in a form of aqueous dispersion obtained by dispersing 1 part by mass of the polymer microparticle in 110 parts by mass of ion exchange water.

2. The additive of claim 1, wherein a content of the ionic functional group in the polymer microparticle between 1.5 and 9.0 mmol/g.

3. The additive of claim 1, wherein the ionic functional group is an acidic functional group neutralized with alkali.

4. The additive of claim 1, comprising 5.0% by mass or less of an adduct of the polymer microparticle with ammonia, a volatile organic amine of an unsaturated monomer, or both.

5. The additive of claim 1, wherein the polymer microparticle is produced by an inverse suspension polymerization method.

6. The additive of claim 5, wherein the inverse suspension polymerization method employs an oil-soluble oxidizing agent and a water-soluble reducing agent as a polymerization initiator.

7. The additive of claim 1, wherein the polymer microparticle is obtained by polymerizing a monomer mixture comprising (meth)acrylic acid, 2-(meth)acrylamide-2-methylpropane sulfonic acid, or both.

8. The additive of claim 7, wherein the monomer mixture further comprises a non-ionic vinyl monomer.

9. The additive of claim 1, wherein a content of a particle having a size of 200 μm or larger when the polymer microparticle is swollen with ion exchange water until the swollen polymer microparticle reaches a saturated state is 1.5% by mass or less.

10. The additive of claim 1, wherein a content of a particle having a size of 5 μm or smaller when the polymer microparticle is dried is 5.0% by mass or less.

11. A method of making a molded ceramic article, the method comprising contacting the additive of claim 1 with a ceramic material, and molding the ceramic material.

12. The additive of claim 1, wherein the average particle size is between 15 and 100 μm.

13. The additive of claim 1, wherein the average particle size is between 20 and 60 μm.

14. The additive of claim 1, wherein the ion exchange water absorbing amount is between 15 and 55 mL/g.

15. The additive of claim 1, wherein the ion exchange water absorbing amount is between 20 and 50 mL/g.

16. The additive of claim 1, wherein the electroconductivity is 1,200 μS/cm or less.

17. The additive of claim 1, wherein the electroconductivity is 800 μS/cm or less.

18. The additive of claim 1, wherein a content of the ionic functional group in the polymer microparticle is between 3.0 and 9.0 mmol/g.

19. The additive of claim 1, comprising 3.0% by mass or less of an adduct of the polymer microparticle with ammonia, a volatile organic amine of an unsaturated monomer, or both.

20. The additive of claim 1, wherein a content of a particle having a size of 200 μm or larger when the polymer microparticle is swollen with ion exchange water until the swollen polymer microparticle reaches a saturated state is 1.0% by mass or less.

* * * * *